United States Patent
D'Angelico

(10) Patent No.: US 10,859,428 B2
(45) Date of Patent: Dec. 8, 2020

(54) APPARATUS FOR RELIABLY DETERMINING AND/OR MONITORING A PROCESS VARIABLE

(71) Applicant: Endress + Hauser SE+Co. KG, Maulburg (DE)

(72) Inventor: Sascha D'Angelico, Rummingen (DE)

(73) Assignee: ENDRESS + HAUSER SE+CO. KG, Maulburg (DE)

( * ) Notice: Subject to any disclaimer, the term of this patent is extended or adjusted under 35 U.S.C. 154(b) by 212 days.

(21) Appl. No.: 15/781,740

(22) PCT Filed: Nov. 9, 2016

(86) PCT No.: PCT/EP2016/077109
§ 371 (c)(1),
(2) Date: Jun. 6, 2018

(87) PCT Pub. No.: WO2017/097528
PCT Pub. Date: Jun. 15, 2017

(65) Prior Publication Data
US 2018/0372534 A1    Dec. 27, 2018

(30) Foreign Application Priority Data

Dec. 11, 2015  (DE) .................. 10 2015 121 621

(51) Int. Cl.
*G01F 25/00* (2006.01)
*G01F 23/296* (2006.01)
*G01N 11/00* (2006.01)

(52) U.S. Cl.
CPC ...... *G01F 25/0076* (2013.01); *G01F 23/2967* (2013.01); *G01F 25/0061* (2013.01); *G01N 11/00* (2013.01); *G01N 2011/0066* (2013.01)

(58) Field of Classification Search
CPC ............ G01F 25/0076; G01F 25/0061; G01F 23/2967; G01N 11/00; G01N 2011/0066
(Continued)

(56) References Cited

U.S. PATENT DOCUMENTS 5,644,299 A    7/1997   Cruickshank
5,895,848 A *  4/1999   Wilson ............... G01F 23/2967
                                                   73/290 R (Continued)

FOREIGN PATENT DOCUMENTS

AT      508 675 A4    3/2011
CN      2355320 Y     12/1999
(Continued)

OTHER PUBLICATIONS

Chinese Office Action in corresponding Chinese Application No. 201680072052.7, dated Jun. 28, 2019.
(Continued)

*Primary Examiner* — Marrit Eyassu
(74) *Attorney, Agent, or Firm* — Bacon & Thomas, PLLC

(57) ABSTRACT

An apparatus for determining and/or monitoring the viscosity, the density and/or a predetermined filling level, having an excitation/receiving unit which excites a mechanically vibratable unit to vibrate, wherein a control/evaluation unit which is connected to the excitation/receiving unit and has a measuring branch and a checking branch separate from the latter is provided. The checking branch is configured to apply an excitation signal to the excitation/receiving unit, to receive the vibrations of the mechanically vibratable unit and to determine at least a first malfunction and a second different malfunction of the mechanically vibratable unit and/or of the excitation/receiving unit from the received vibrations, wherein the excitation signal of the checking branch has a continuous changing frequency which is
(Continued)

described by a frequency/time function and passes through a plurality of modes of the mechanically vibratable unit.

15 Claims, 3 Drawing Sheets

(58) Field of Classification Search
USPC .......................................................... 73/1.73
See application file for complete search history.

(56) References Cited

U.S. PATENT DOCUMENTS

| | | | | |
|---|---|---|---|---|
| 7,723,898 | B2* | 5/2010 | Wohrle | G01F 23/2961 310/314 |
| 2004/0078164 | A1* | 4/2004 | Lopatin | G01F 23/2967 702/100 |
| 2004/0244481 | A1* | 12/2004 | Woehrle | G01F 23/2967 73/290 V |
| 2005/0092081 | A1* | 5/2005 | Spanke | G01F 23/2962 73/290 V |
| 2012/0174671 | A1* | 7/2012 | Urban | G01F 23/296 73/579 |

FOREIGN PATENT DOCUMENTS

| | | | |
|---|---|---|---|
| CN | 101271018 A | 9/2008 | |
| CN | 102549399 A | 7/2012 | |
| CN | 104677580 A | 6/2015 | |
| DE | 10 2005 009 580 A1 | 9/2006 | |
| DE | 10 2008 032 887 A1 | 1/2010 | |
| DE | 10 2009 045 204 A1 | 4/2011 | |
| DE | 10 2015 121 621 A1 | 6/2017 | |
| DE | 10 2015 121 621 B4 | 3/2018 | |
| EP | 1 624 291 A2 | 2/2006 | |
| EP | 1624291 A2 * | 2/2006 | ......... G01F 23/2967 |
| WO | 2006/042786 A2 | 4/2006 | |
| WO | 2006/092350 A1 | 9/2006 | |
| WO | 2011/018312 A1 | 2/2011 | |
| WO | 2011/038985 A1 | 4/2011 | |

OTHER PUBLICATIONS

German Search Report, German PTO, Munich, dated Jul. 27, 2016.
International Search Report, EPO, The Netherlands, dated Jan. 23, 2017.

* cited by examiner

APPARATUS FOR RELIABLY DETERMINING AND/OR MONITORING A PROCESS VARIABLE

TECHNICAL FIELD

The invention relates to a device for the safe determination and/or monitoring of at least one process variable of a medium. The process variable of the medium is, for example, the viscosity, the density, or a predetermined fill-level. The medium is, for example, in a container, a tank, or in a pipeline. The medium is, for example, a liquid, or else a solid, powdery, or granular medium.

BACKGROUND DISCUSSION

In process and/or automation technology, field devices are used for determining and/or monitoring process variables— in particular, physical or chemical process variables. A field device typically comprises at least one sensor unit at least partially and at least temporarily in contact with the process. In the context of the present application, field devices are, in principle, all measuring devices which are used in close proximity to the process and which supply or process process-relevant information. These are, for example, fill-level measuring devices, flow meters, pressure and temperature measuring devices, pH-redox potential meters, conductivity meters, etc., which are used for recording the respective process variables, such as fill level, flow, pressure, temperature, pH level, and conductivity. Such field devices are manufactured and sold in various configurations by the E+H Group.

In a large number of these field devices, the sensor unit coming into contact with the process is based upon a mechanically-vibratable unit. In the case of level measuring devices, such so-called vibronic sensors have, for example, a tuning fork, a single rod, or a membrane as a mechanically-vibratable unit. During operation, the latter is excited into mechanical vibration by an excitation/receiving unit—often in the form of an electromechanical transducer, which can, in turn, be a piezoelectric drive or an electromagnetic drive. In the case of flow meters with at least one vibratable unit, this can also be designed as a vibratable tube, which is traversed by the respective medium, such as in a sensor working according to the Coriolis principle.

For the sake of simplicity, the following description of the vibronic sensor is limited to fill-level measuring devices with a vibratable unit, reference being made at appropriate points to other possible applications of the inventive solution. Corresponding fill-level measuring devices based upon vibronic sensors are marketed by the Endress+Hauser GmbH+Co. KG—for example, under the names, LIQUIPHANT or SOLIPHANT.

The underlying measurement principles are essentially known. The excitation/receiving unit excites the mechanically-vibrating unit to mechanical vibration via an electrical excitation signal. Conversely, the excitation/receiving unit can receive the mechanical vibrations of the mechanical-vibrating unit and transform them into an electrical receiving signal. The excitation/receiving unit is accordingly either a separate excitation/exciting unit and a separate receiving unit, or a combined excitation/receiving unit. From the received vibrations of the mechanically-vibratable unit (natural frequency, resonance frequency, phase with respect to excitation, amplitude and/or changes thereof), at least one process variable is then identified or determined and/or monitored.

Depending upon the field of application, very high demands are placed on functional safety for vibronic or other sensors. Functional safety is usually classified using various levels, or so-called "Safety Integrity Level" (SIL). One way to provide a functionally-safe sensor is to use multiple sensors, and thus achieve a certain redundancy. Another possibility is to monitor and display possible malfunctions of the sensor.

It is advantageous here for sensors which are in an installed state during the application that the malfunction in the installed state can be monitored and displayed. It is particularly advantageous if the monitoring of possible malfunctions takes place during operation, and thus simultaneously for the determination and/or monitoring of the process variable.

In the prior art, various methods for detecting a variety of malfunctions of vibronic sensors have become known.

A common malfunction of a vibronic sensor are deposits to the mechanically-vibratable unit of the vibronic sensor. In German Patent, DE 0000 100 147 24 A1, for example, deposits are detected by evaluating two different modes of the mechanically-vibratable unit, wherein each of two modes reacts differently to the deposit. In contrast, German patent, DE 0000 103 282 96 A1 detects deposits based upon a limit value for the vibration frequency of the mechanically-vibratable unit being exceeded. In order to be able to distinguish deposits from changing process conditions and/or process variables, the limit value is determined taking into account measured and/or calculated dependencies of the frequency of maximum and minimum possible process conditions and/or the process variables to be monitored and/or determined. In German patent, DE 10 2009 045 204 A1, deposits are detected by means of a frequency search pass and on the basis of the rate of decay of the amplitude. The frequency search pass is preferably located within a narrow frequency band around the resonance frequency.

Furthermore, frequent malfunctions may be present, not on the mechanically-vibratable unit itself, but on the excitation/receiving unit of the mechanically-vibratable unit. An example of this is cable breakage. If a piezoelectric element is present as the excitation/receiving unit, another possible malfunction is, for example, the depolarization of the exciting piezoelectric element. German patent, DE 10 2004 027 397 A1 discloses a method for cable break detection by means of a second vibrating circuit and a feedback loop. German patent, DE 10 2008 032 887 A1 specifies a device and a method in which impedances, capacitances, and inductances of a test unit are evaluated. From this disclosure, it can be seen that the test unit for detecting cable breaks, i.e., a defect in the excitation/receiving unit (here, preferably, a piezoelectric element), is used.

A disadvantage of the technical solutions known in the prior art for detecting malfunctions is that the technical solution is always tailored to a specified malfunction. In particular, no technical solution has become known with which, at the same time, a malfunction of the mechanically-vibratable unit as well as a malfunction of the excitation/receiving unit, which excites the mechanically-vibratable unit, can be detected and classified.

If one wishes to be able to display a number of different malfunctions for a functionally-reliable vibronic sensor, the above-mentioned technical solutions, for example, would, therefore, have to be realized and combined simultaneously. Due to the requirements of standardized solutions and design restrictions, this is not always possible, or is associated with significant effort and, therefore, high costs. Furthermore, it can also be counterproductive to provide a vibronic sensor with many different components that are to monitor functional safety with respect to a specific functionality: with each additional component, there is also an additional possibility of failure of that component or failure of the interaction among the different components introduced. It is therefore desirable to be able to discover and assign a number of different malfunctions of a vibronic sensor, using a single technical solution.

SUMMARY OF THE INVENTION

The invention is therefore based upon the aim of providing a vibronic sensor that can easily discover as many different malfunctions on the mechanically-vibratable unit and/or the excitation/receiving unit of the mechanically-vibratable unit as possible.

The aim is achieved by a device for determining and/or monitoring the viscosity, the density, and/or a predetermined fill-level, with an excitation/receiving unit, which excites a mechanically-vibratable unit to vibrate, wherein a control/evaluation unit which is connected to the excitation/receiving unit and has a measuring branch and a checking branch separated therefrom is provided. The measuring branch is configured to apply an excitation signal to the excitation/receiving unit, to receive the vibrations of the mechanically-vibratable unit, and to determine and/or monitor the viscosity, the density, and/or the predetermined fill-level from the received vibrations. The checking branch is configured to apply an excitation signal to the excitation/receiving unit in order to receive the vibrations of the mechanically-vibratable unit, and to determine at least one first and one different second malfunction of the mechanically-vibratable unit and/or the excitation/receiving unit, wherein the excitation signal of the checking branch has a continuously changing frequency, which is described by a frequency/time function and undergoes several modes of the mechanically-vibratable unit.

The complete spectrum of the vibration system theoretically contains all information about the state of the vibration system, wherein the vibration system consists of the mechanically-vibratable unit and the excitation/receiving unit. To gain the full spectrum, in principle, the system must be excited in steps with a plurality of frequencies from a wide frequency band, in order to determine the amplitude and/or phase of the vibration after each transient at each of these stepwise excited frequencies. In doing so, the frequency band must include all those modes that are sensitive to possible relevant malfunctions. Such a recording of the spectrum is very complex, and, therefore, hardly practicable during the measurement or alternately for a measurement.

A good approximation can therefore be obtained by traversing the range of the amplitude and/or the phase spectrum, which is sensitive to possible relevant malfunctions, using a frequency/time function. The frequency/time function passes through several modes of the mechanically-vibratable unit. For the person skilled in the art, the specific configuration of the frequency/time function results as a function of the configuration of the vibronic sensor. The rate of change of the frequency should be selected so that the function check carried out by the checking branch can be carried out as swiftly as possible, and, at the same time, the presence of possible malfunctions can be clearly recognized. Swift means that the period of time in which the entire frequency/time function is traversed should be of a similar magnitude or, in the optimal case, even smaller than the period of time during which—typically, during the application—changes in the process variable and/or in the process conditions take place. Clearly means that unambiguously suitable criteria can be found to differentiate the at least two malfunctions from the influences of the process variable and variable process conditions, so that exceeding or falling short of the respective criterion is a reliable indication of the presence of the respective malfunction. Depending upon the configuration of the vibronic sensor and the specific malfunction, the criteria can also be used to determine exactly which of the at least two malfunctions is present, so that the invention not only detects the presence of the at least two different malfunctions, but also allows an unambiguous and thus selective determination of the at least two different malfunctions.

The information about the presence of possible malfunctions is thus obtained on the basis of predetermined, calculated, and/or measured criteria from the shape of the amplitude and/or of the phase spectrum. One possibility is, for example, to determine a malfunction from the position of the frequencies of predetermined modes relative to one another. Another possibility is to determine a malfunction from the amplitude ratios and/or phase differences of two or more predetermined modes. The number of different modes that have to be traversed to detect a particular malfunction and also the frequency/time function depend upon the configuration of the vibronic sensor and the specific malfunction.

The control/evaluation unit is configured to further process the vibrations received by the excitation/receiving unit in each case in the measuring branch and the checking branch, or to pass on the vibrations received from the excitation/receiving unit to the measuring branch and the checking branch. Furthermore, the control/evaluation unit is configured to control and evaluate the different components of the device. The criteria for determining the various malfunctions are also stored in the control/evaluation unit or one or more components of the control/evaluation unit. One possibility is also that the control/evaluation unit determines the criteria for determining the at least two malfunctions from measured and/or calculated relationships between the process variable, the mechanically-vibratable unit, the excitation/receiving unit, and/or the medium.

The core of the invention is therefore to provide a checking branch, which is designed to generate a sufficiently good approximation of the complete amplitude and/or phase spectrum of the vibration system consisting of the mechanically-vibratable unit and the excitation/receiving unit. This allows in a simple manner for the simultaneous detection of malfunctions in the mechanically-vibratable unit and in the excitation/receiving unit of the mechanically-vibratable unit. Ideally, as many different malfunctions as possible are monitored and distinguished, based upon defined criteria. The device according to the invention in this case provides for determining at least two, mutually different malfunctions. If a suitable frequency/time function is selected, at least, additionally, the presence of many different malfunctions can be displayed.

In one development of the invention, the checking branch has a microcontroller, wherein the microcontroller is designed to control the continuously changing frequency of the excitation signal.

In a variant of the device according to the invention, the microcontroller is configured to filter out the vibrations with the frequency of the excitation signal from the vibrations received. In this variant, the microcontroller is thus able both to specify the excitation frequency and to filter out from the vibrations received exactly those which have the frequency of the excitation frequency or lie in a narrow band around the excitation frequency.

In a development of the invention, the microcontroller and the control/evaluation unit are designed
    to determine the absolute value of the amplitude from the received vibrations belonging to the given frequency and
    to create an enveloping function from the absolute value of the amplitude and the given frequency/time function,
wherein the control/evaluation unit determines the at least two different malfunctions of the mechanically-vibratable unit and/or the excitation/receiving unit on the basis of the envelope function and/or the phase of the vibration received and the predetermined frequency/time function.

Thus, on the basis of the microcontroller and the control/evaluation unit, from the profile of the absolute values of the amplitude of the received vibrations of the checking branch, a function is obtained which envelops the time profile of the absolute values of the amplitudes. The course of the enveloping function of the absolute value of the amplitude as a function of the frequency (or as a function of time) can then be evaluated. The at least two different malfunctions can be discerned, on the basis of the enveloping function thus determined, in the amplitude spectrum and/or in the phase spectrum. Depending upon the configuration of the invention, the at least two malfunctions can even be distinguished, so that the invention also makes possible a clear determination of the malfunction, and thus a specific or selective fault diagnosis.

In one embodiment of the invention, the checking branch additionally has a variable frequency filter, wherein the variable frequency filter is configured to filter out the vibrations of a given frequency from the received vibrations, and wherein the microcontroller is configured to specify the frequency of the excitation signal to the variable frequency filter as the frequency to be filtered. In this variant of the invention, the device is therefore able, on the basis of the variable frequency filter, to filter out from the received vibrations exactly those which have the frequency of the excitation frequency or lie in a narrow band around the excitation frequency. The variable frequency filter or bandpass is controlled in this variant by the microcontroller.

In a development of this configuration of the invention, a peak value rectifier is connected downstream of the frequency filter of the checking branch. The control/evaluation unit is configured to determine the at least two different malfunctions of the mechanically-vibratable unit and/or the excitation/receiving unit on the basis of the values determined by the peak value rectifier and the predetermined frequency/time function.

In a variant of the invention, a switch is located between the excitation/receiving unit and the control/evaluation unit. The switch is controlled by the control/evaluation unit so that it connects the excitation/receiving unit either with the measuring branch or with the checking branch. In this variant of the invention, the measurement must therefore be interrupted for the duration of the passage of the frequency/time function.

In an alternative variant of the invention, there is an adder between the excitation/receiving unit and the control/evaluation unit, wherein the adder is configured such that, from the excitation signal of the measuring branch and the excitation signal of the checking branch, it generates a common excitation signal which controls the excitation/receiving unit. The measuring branch determines and/or monitors the process variable from the vibrations received. The checking branch makes use of the vibrations received to monitor the at least two different malfunctions.

In this particularly advantageous variant of the invention, the monitoring of possible malfunctions can therefore take place simultaneously for the determination and/or monitoring of the process variable.

In one development of the invention, at least one of the at least two malfunctions is a malfunction of the mechanically-vibratable unit. The malfunction of the mechanically-vibratable unit may be deposits, corrosion, and/or abrasion on the mechanically-vibratable unit.

It has become known in the prior art that deposits or corrosion on the mechanically-vibratable unit has different effects on the different modes of the mechanically-vibratable unit. If such modes that react differently to deposits or corrosion lie in the traversed frequency range of the frequency/time function, from the location of the frequencies in relation to each other, deposits or corrosion can be detected on the basis of one criterion.

In one embodiment of the invention, the mechanically-vibratable unit is a tuning fork with two prongs. In this case, one of the at least two malfunctions is a blockage of the two prongs and/or a bending of at least one of the two prongs.

The blockage and/or the bending of the prongs of the tuning fork can be caused, for example, by clumping of solid constituents of the medium.

In an alternative configuration, the mechanically-vibratable unit is a membrane. In this case, one of the at least two malfunctions is a crack in the membrane and/or a perforation of the membrane.

In one embodiment of the invention, the excitation/receiving unit is at least one piezoelectric element. In this case, one of the at least two malfunctions is a fracture of the piezoelectric element, a depolarization of the piezoelectric element, and/or an incorrect electrical bias of the piezoelectric element.

In one development of the invention, the excitation/receiving unit is bonded by adhesion to the mechanical-vibratable unit; then, one of the at least two malfunctions is a detachment of the adhesion site.

In one embodiment of the invention, the excitation/receiving unit is connected by at least one cable and/or a plug to the electronics unit. In this case, one of the at least two malfunctions is a breakage and/or an insulation defect of the at least one cable and/or plug between the excitation/receiving unit and/or the electronics unit.

In a further embodiment, one of the at least two malfunctions is a short circuit in the excitation/receiving unit and/or condensation on the excitation/receiving unit.

BRIEF DESCRIPTION OF THE DRAWINGS

The invention is explained in greater detail with reference to the following figures. These show.

DETAILED DISCUSSION IN CONJUNCTION WITH THE DRAWINGS

Figure 1:
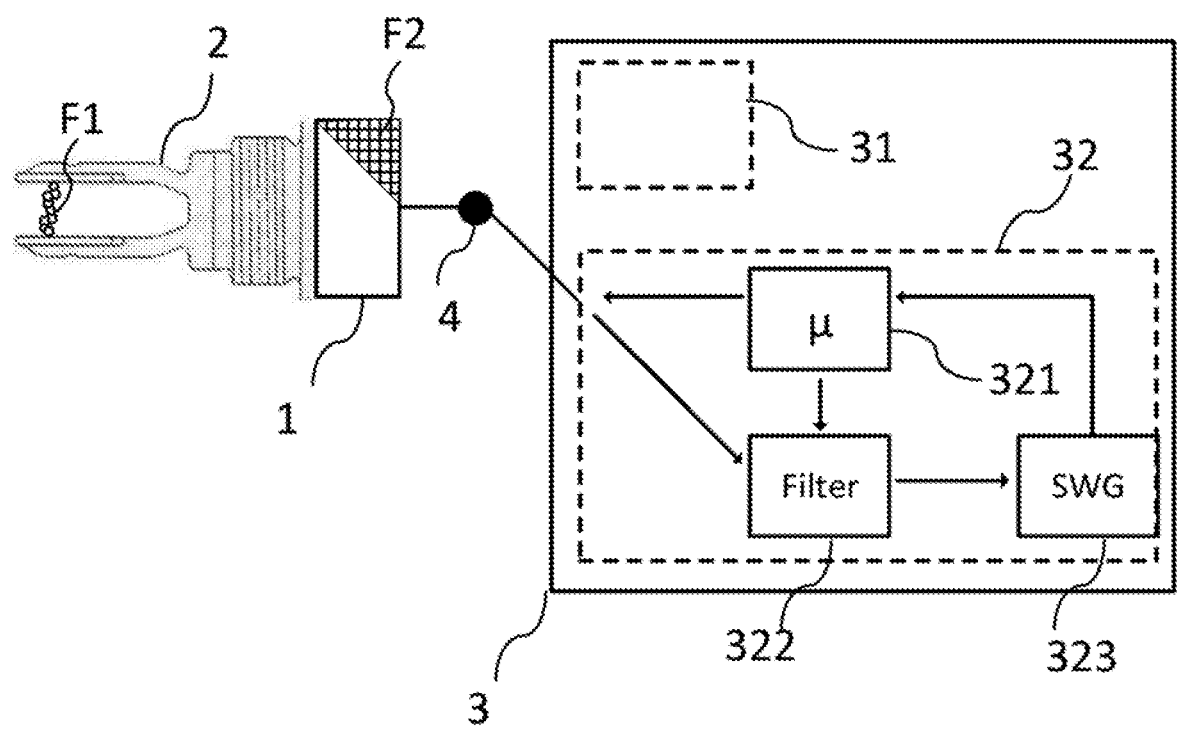
FIG. 1: is a configuration of the device according to the invention.

In FIG. 1, an embodiment of the device according to the invention is shown. The mechanically-vibratable unit 2 is realized here as a tuning fork with two prongs. For excitation of the mechanically-vibratable unit 2, the excitation/receiving unit 1 is provided, e.g., in the form of a piezoelectric element or, alternatively, based upon an inductive transducer element. The control/evaluation unit 3 is connected to the excitation/receiving unit 1, which is configured to apply a voltage to the piezoelectric element and, from the vibrations received, to determine and/or monitor the process variable and at least two different malfunctions F1, F2, . . . of the tuning fork and/or the piezoelectric element. For determining and/or monitoring the process variable, the measuring branch 31 is provided, while, for the determination of the at least two different malfunctions F1, F2, . . . , the checking branch 32 is provided.

In this exemplary embodiment of the invention, a switch 4 is provided between the excitation/receiving unit 1 and the control/evaluation unit 3. In this case, the determination and/or monitoring of the process variable can be carried out, alternately, to determine the at least two different malfunctions F1, F2, . . . .

In an alternative embodiment of the invention, an adder is located between the excitation/receiving unit 1 and the control/evaluation unit 3, wherein the adder generates a common excitation voltage from the excitation voltage of the measuring branch 31 and the excitation voltage of the checking branch 32.

The checking branch 32 in this embodiment of the invention has a microcontroller 321, a variable frequency filter 322, and a peak rectifier 323. At the same time, the microcontroller 321 regulates the frequency of the excitation voltage which changes with respect to the frequency/time function, and feeds the variable frequency filter 322 to the respective excitation frequency or to a narrow band (bandpass) around the excitation frequency of the checking branch 32.

The peak value rectifier 323 is connected downstream of the variable frequency filter 322. The microcontroller 321 can then use the vibrations received to, for example, create an enveloping function of the amplitude and/or phase spectrum, and, further, on the basis of the enveloping function and predetermined criteria, check whether the at least two malfunctions F1, F2, . . . of the tuning fork and/or the piezoelectric element are present.

In an alternative embodiment of the invention, the microcontroller 321 is configured to perform the above-mentioned technical tasks of the variable frequency filter 322 and the peak value rectifier 323.

Also illustrated in FIG. 1 is a malfunction F1 on the tuning fork (or on the mechanically-vibratable unit 2) and a further malfunction F2 on the excitation/receiving unit 1 that is different from the first malfunction F1. The malfunction F1 shown here of the tuning fork is a blocking or jamming of the tuning fork—for example, due to a tough, sticky, and/or granular medium. The malfunction F2 of the piezoelectric element shown here is a fracture of the piezoelectric element.

Figure 2A:
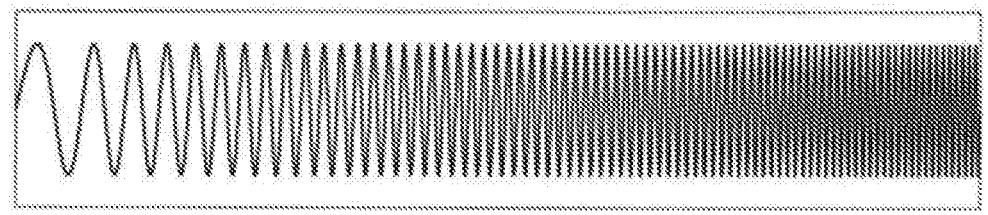
FIGS. 2a and 2b: show the excitation signal according to the checking branch of the device according to the invention.
Figure 2B:
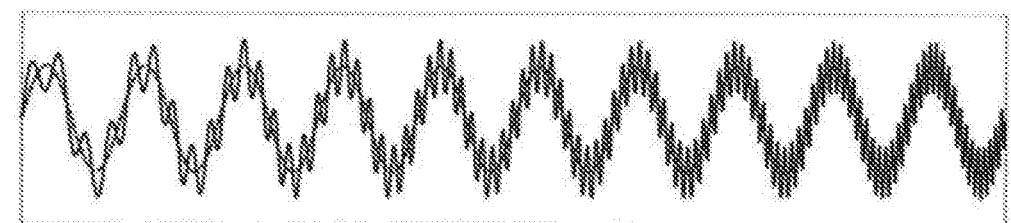

FIGS. 2a and 2b show the time course of the excitation voltage of a piezoelectric element, which excites a mechanically-vibratable unit 2.

FIG. 2a shows the sinusoidal excitation voltage, which is predetermined by the checking branch 32 with the time-varying frequency, wherein the temporal change of the frequency is described on the basis of a continuous frequency/time function. Continuous, in the sense of this application, is to be understood as the change of the excitation frequency being approximately continuous or stepless.

FIG. 2b shows an excitation voltage, wherein an excitation by an—over time—continuously changing frequency is modulated onto an excitation by a constant frequency. This excitation voltage is present in the variant of the invention in which an adder generates a common excitation voltage from the excitation voltage of the measuring branch 31 and the excitation voltage of the checking branch 32.

This is thus the excitation voltage of an exemplary embodiment of the particularly advantageous variant of the invention, in which the monitoring of possible malfunctions (F1, F2, . . . ) takes place simultaneously for the determination and/or monitoring of the process variable.

Figure 3:
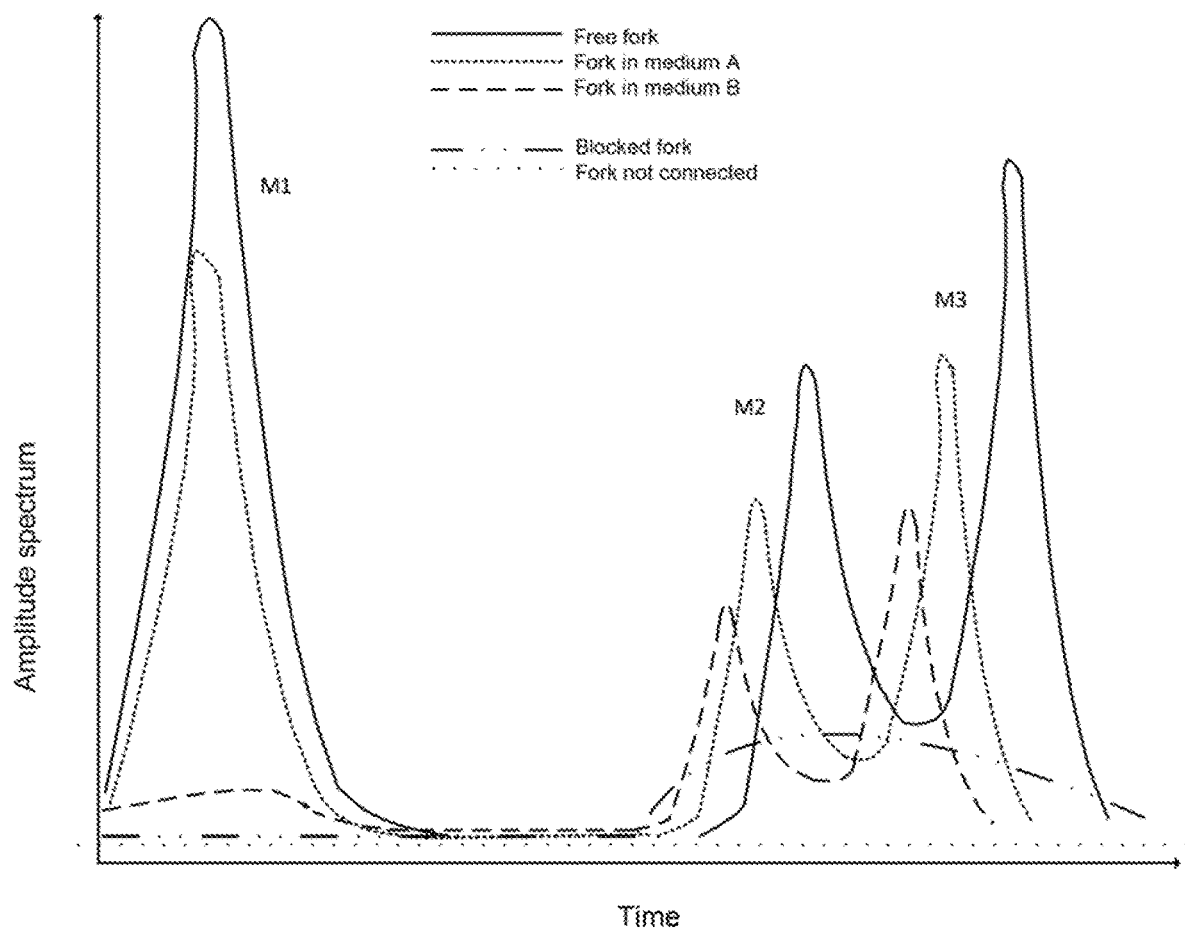
FIG. 3: is an amplitude spectrum obtained on the basis of the checking branch.

FIG. 3 shows an example of how at least one malfunction can be detected on the basis of the shape of the received vibrations of the checking branch 32. For this purpose, the amplitude spectrum is shown, in which the amplitude of the received vibration of the vibration system consisting of the mechanically-vibratable unit 2 (here a tuning fork) and excitation/receiving unit 1 (here, a piezoelectric element) is plotted as a function of time. The amplitude corresponds to the vibration of the tuning fork at a frequency filtered by the variable frequency fitter 322. The frequency corresponds to precisely that frequency which is passed from the checking branch 32 as the excitation frequency to the excitation/receiving unit 1 of the tuning fork. Depending upon the embodiment of the invention, the function enveloping the time course of the absolute values is formed, on the basis of the peak value rectifier 323 or on the basis of the microcontroller 321 and the control/evaluation unit 3, from the time profile of the absolute values of the amplitude of the received vibrations of the checking branch 32. This enveloping function is plotted as an amplitude spectrum.

The selected frequency/time function is a continuous, strictly monotonous function. A strictly monotonous function means that the frequency always becomes either continuously larger or continuously smaller. In an alternative configuration of the invention, the frequency/time function can also traverse successively different, separate frequency ranges. In this exemplary embodiment, the time required to traverse the frequency/time function is less than 10 seconds; this period of time is suitable for carrying out a swift check in the application—in particular, in the especially preferred variant of the invention in which the monitoring of possible malfunctions F1, F2, . . . occurs simultaneously with the determination and/or monitoring of the process variable.

The choice shown here for the embodiment of the frequency/time function and the start or end frequency has been chosen by the person skilled in the art for the selected vibration system, i.e., depending upon the selected tuning fork, the exciting piezoelectric element, and the possible malfunctions F1, F2, . . . . In this case, for example, the smallest mode or the fundamental mode M1 of the mechanically-vibratable unit 2 is selected as the excitation frequency of the frequency/time function, while the maximum mode Mi is selected as the final frequency, which is relevant for the detection of a possible malfunction F1, F2, . . . . If other vibronic sensors are used, it is possible, through a series of tests and inducement of the malfunction F1, F2, . . . to be observed, to detect the therefor sensitive mode(s) M1, M2, . . . , in order to determine the frequency band to be traversed by the frequency/time function, as well as the rate of change.

Based upon the frequency/time function, the time axis can also be rescaled into a corresponding frequency axis, so as to assign the observed peaks to known modes M1, M2, . . . of the tuning fork. In the exemplary embodiment of the invention shown here, it can clearly be seen that the spectrum obtained in this way contains the necessary information for determining at least two different malfunctions F1, F2, . . . according to the criteria specified for the respective vibronic sensor.

Shown is the vibration system without malfunction F1, F2, . . . —once for the tuning fork without contact with the medium, once for a medium A with a predetermined viscosity and density, and once for a medium B, which has a viscosity and/or density different from the medium A. The selected viscosity of the medium B is extremely high in the case shown here. In practice, the tuning fork shown here is typically used for media whose viscosity is substantially less than that of the medium B, so that the medium B represents a limiting case for the case of a highly viscous medium. At the selected predetermined frequency/time function, the amplitudes in the modes M1, M2, M3 of the tuning fork are clearly visible in all three of these cases.

Furthermore, the spectrum for a non-connected tuning fork is shown, which differs significantly from the three shown cases of a fully-functional vibration system, since, over the entire time span or the entire frequency band, no modes Mi (i=1, . . . ) are formed.

Furthermore, it can be seen that, for the highly-viscous medium B, only with the modes M2 and M3 can a clear difference between a blocked tuning fork and a non-connected tuning fork be seen. Therefore, in this embodiment of the invention, appropriate criteria can be defined for distinguishing a functional fork in various media from a non-connected fork due to cable break (dotted-dashed line) and a blocked fork (dotted line). If such modes M1, M2, . . . that react differently to deposits or corrosion lie in the traversed frequency range of the frequency/time function, from the location of the frequencies in relation to each other, deposits or corrosion can, in addition, still be detected on the basis of a suitable criterion.

In the exemplary embodiment of the invention shown here, at least two different malfunctions F1, F2 can thus be reliably detected and even distinguished from one another, viz., a blockage of the tuning fork and a cable break between the tuning fork and the excitation/receiving unit 1.

The invention claimed is:

1. A device for determining and/or monitoring the viscosity, the density, and/or a predetermined fill-level, having:
an excitation/receiving unit; which excites a mechanically-vibratable unit to mechanically vibrate; and
a control/evaluation unit which is connected to said excitation/receiving unit and has a measuring branch and a checking branch separated therefrom, wherein:
said measuring branch is configured to apply an excitation signal to said excitation/receiving unit in order to receive the vibrations of said mechanically-vibratable unit, and to determine and/or monitor the viscosity, the density, and/or the predetermined fill-level from the received vibrations; and
said checking branch is embodied to apply an excitation signal to said excitation/receiving unit in order to receive the vibrations of said mechanically-vibratable unit, and to determine from the received vibrations at least a first and a second, therefrom different, malfunction (F1, F2, . . . ) of said mechanically-vibratable unit and/or said excitation/receiving unit; and
the excitation signal of said checking branch has a continuously changing frequency, which is described by a frequency/time function and passes through several modes (M1, M2, . . . ) of said mechanically-vibratable unit.

2. The device according to claim 1, wherein:
said checking branch has a microcontroller, said microcontroller is configured to control the continuously changing frequency of the excitation signal.

3. The device according to claim 2, wherein:
said microcontroller is embodied to filter out the vibrations with the frequency of the excitation signal from the vibrations received.

4. The device according to claim 3, wherein:
said microcontroller and said control/evaluation unit are configured:
to determine the absolute value of the amplitude from the received vibrations belonging to the given frequency; and
to create an enveloping function from the absolute value of the amplitude and the given frequency/time function; and
said control/evaluation unit, based upon the enveloping function and/or the phase of the received vibration and the predetermined frequency/time function, determines the at least two different malfunctions of said mechanically-vibratable unit and/or said excitation/receiving unit.

5. The device according to claim 1, wherein:
said checking branch has a variable frequency filter;
said variable frequency filter is configured to filter out the vibrations of a given frequency from the received vibrations; and
said microcontroller is configured to specify the frequency of the excitation signal as the frequency to be filtered to said variable frequency filter.

6. The device according to claim 5, further comprising:
a peak value rectifier wherein:
said peak value rectifier is connected downstream of said frequency filter of the checking branch; and
said control/evaluation unit is configured, based upon the values determined by said peak value rectifier and the predetermined frequency/time function, to determine the at least two different malfunctions of said mechanically-vibratable unit and/or said excitation/receiving unit.

7. The device according to claim 1, further comprising:
a switch located between said excitation/receiving unit and said control/evaluation unit; and
said switch is so controlled by said control/evaluation unit that it connects said excitation/receiving unit in each case either to said measuring branch or to said checking branch.

8. The device according to claim 1, further comprising:
an adder located between said excitation/receiving unit and said control/evaluation unit, wherein: said adder is so configured that, from the excitation signal of said measuring branch and the excitation signal of said checking branch, it generates a common excitation signal which controls said excitation/receiving unit.

9. The device according to claim 1, wherein:
at least one of the at least two malfunctions is a malfunction of said mechanically-vibratable unit; and
the malfunction of said mechanically-vibratable unit is deposits, corrosion, and/or abrasion on said mechanically-vibratable unit.

10. The device according to claim 1, wherein:
said mechanically-vibratable unit is a tuning fork with two prongs; and
one of the at least two malfunctions is a blockage of said two prongs and/or a bending of at least one of said two prongs.

11. The device according to claim 1, wherein:
said mechanically-vibratable unit is a membrane; and
one of the at least two malfunctions is a crack in said membrane and/or a perforation of said membrane.

12. The device according to claim 1, wherein:
said excitation/receiving unit is at least one piezoelectric element; and
one of the at least two malfunctions is a fracture of said piezoelectric element, a depolarization of said piezoelectric element, and/or an incorrect electrical bias of said piezoelectric element.

13. The device according to claim 1, wherein:
said excitation/receiving unit is bonded by adhesion to said mechanical-vibratable unit; and
one of the at least two malfunctions is a detachment of the adhesion site.

14. The device according to claim 1, wherein:
said excitation/receiving unit is connected to said electronics unit by at least one cable and/or a plug; and
one of the at least two malfunctions is a breakage and/or an insulation defect of said at least one cable and/or plug between said excitation/receiving unit and/or said electronics unit.

15. The device according to claim 1, wherein:
one of the at least two malfunctions is a short circuit in and/or condensation on said excitation/receiving unit.

* * * * *